United States Patent
Liu et al.

(10) Patent No.: US 8,878,861 B2
(45) Date of Patent: Nov. 4, 2014

(54) CONVERSION BETWEEN Z-SCANNING INDICES, RASTER-SCANNING INDICES AND 2-D COORDINATES USING SIMPLE BIT-OPERATIONS IN HEVC

(75) Inventors: Wei Liu, San Jose, CA (US); Lina Dong, San Jose, CA (US)

(73) Assignee: Sony Corporation, Tokyo (JP)

( * ) Notice: Subject to any disclaimer, the term of this patent is extended or adjusted under 35 U.S.C. 154(b) by 789 days.

(21) Appl. No.: 13/038,168

(22) Filed: Mar. 1, 2011

(65) Prior Publication Data

US 2012/0223950 A1    Sep. 6, 2012

(51) Int. Cl.
*G06F 13/28*    (2006.01)

(52) U.S. Cl.
USPC .......................................... 345/533

(58) Field of Classification Search
None
See application file for complete search history.

(56) References Cited

U.S. PATENT DOCUMENTS

| | | | |
|---|---|---|---|
| 4,882,683 A * | 11/1989 | Rupp et al. ..................... | 345/568 |
| 5,142,621 A * | 8/1992 | Guttag et al. .................. | 345/561 |
| 5,606,650 A * | 2/1997 | Kelley et al. ................... | 345/552 |
| 6,215,507 B1 * | 4/2001 | Nally et al. ..................... | 345/568 |
| 6,356,988 B1 * | 3/2002 | Takizawa ........................ | 711/202 |
| 7,136,068 B1 * | 11/2006 | Priem et al. .................... | 345/503 |
| 2012/0163455 A1 * | 6/2012 | Zheng et al. ............. | 375/240.13 |

OTHER PUBLICATIONS

Plummer; "A String Based Morton Order Spatial Index;" Dec. 2008; University of Maine; www.spatial.maine.edu/~mark.a.../Morton-GEOG664-Plummer.pdf.*
David S.Wise; "Ahnentafel Indexing Into Morton-Ordered Arrays, or Matrix Locality for Free" A. Bode et al. (Eds.): Euro-Par 2000, LNCS 1900, pp. 774-783, 2000 Springer-Verlag Berlin Heidelberg 2000.*
Jin et al.;"SFCGen: A Framework for Efficient Generation of Multi-Dimensional Space-Filling Curves by Recursion;" ACM Transactions on Mathematical Software, vol. 31, No. 1, Mar. 2005, pp. 120-148.*
Asano et al.; "Space-filling curves and their use in the design of geometric data structures;" Theoretical Computer Science 181 (1997) 3-15; Elsevier Science B.V.*
hevc.kw.bbc.co.uk/ft/jctvc-a124-stripped/README-data-structure.ppt, May 2010.

* cited by examiner

*Primary Examiner* — Edward Martello
(74) *Attorney, Agent, or Firm* — Haverstock & Owens LLP

(57) ABSTRACT

Conversion between z-scanning indices, raster-scanning indices and two-dimensional coordinates uses simple bit-operations in high efficiency video coding. Depending on the conversion, certain bits are extracted from one representation to obtain positions of another representation, or bits are interleaved to generate another representation. Conversion is able to be between any of z-scanning indices, raster-scanning indices and (x,y) representations.

25 Claims, 4 Drawing Sheets

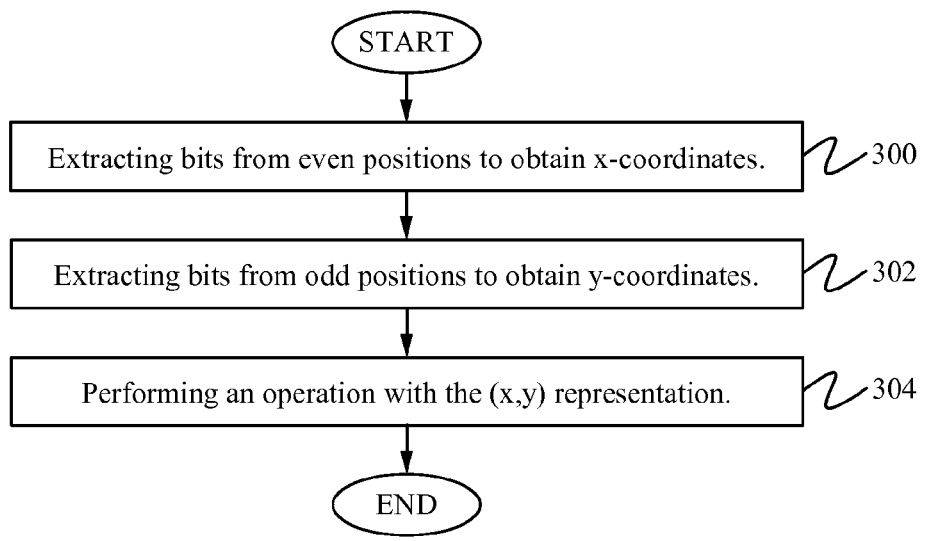
Fig. 2
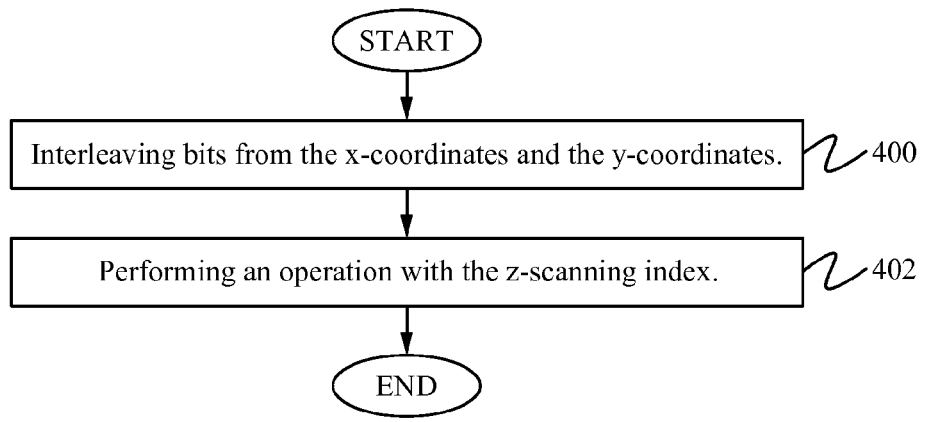
Fig. 3
Fig. 4

US 8,878,861 B2

CONVERSION BETWEEN Z-SCANNING INDICES, RASTER-SCANNING INDICES AND 2-D COORDINATES USING SIMPLE BIT-OPERATIONS IN HEVC

FIELD OF THE INVENTION

The present invention relates to the field of image processing. More specifically, the present invention relates to converting data using simple bit operations.

BACKGROUND OF THE INVENTION

High Efficiency Video Coding (HVEC) uses a quad-tree structure to represent coding units (CUs) and sub-partitions. A CU or a sub-partition is able to be identified by an index represented in three different representations: one-dimensional Z-scanning representation, one-dimensional raster-scanning representation and two-dimensional (x,y) representation. Conversion between a z-scanning representation to a two-dimensional (x,y) representation is quite frequent (e.g. when locating neighboring sub-partitions), and such conversion is usually performed using table lookups.

Typically, at least four lookup tables are used to convert between z-scanning, raster-scanning and two-dimensional (x, y) representations. For example, two for converting between z-scanning and raster-scanning, another two for converting between raster-scanning and (x,y); to convert between z-scanning and (x,y) representation, a two-step table lookup is used. FIG. 1 illustrates tables of data conversion from z-scanning indexes to raster scanning indexes to two-dimensional (x,y) coordinates. In this figure, each table only has 16 entries. However, in HEVC, a typical maximum CU size (64×64) and depth (4) requires 256 entries to be stored for each table. Storage of multiple lookup tables consumes a lot of gates in HW implementations.

SUMMARY OF THE INVENTION

Conversion between z-scanning indices, raster-scanning indices and two-dimensional coordinates uses simple bit-operations in high efficiency video coding (HEVC). Depending on the conversion, certain bits are extracted from one representation to obtain positions of another representation, or bits are interleaved to generate another representation. Conversion is able to be between any of z-scanning indices, raster-scanning indices and (x,y) representations.

In one aspect, a method of converting data in a controller of a device comprises extracting a first set of bits from even positions of an index to obtain x-coordinates, extracting a second set of bits from odd positions of the index to obtain y-coordinates and performing an operation with the x-coordinates and the y-coordinates. The index is a z-scanning index. A most significant bit of a binary representation of the z-scanning index is numbered as position 0, a second most significant bit is numbered as position 1, and subsequent bits are numbered accordingly Performing the operation comprises storing the x-coordinates and the y-coordinates as an (x,y) representation, transferring the x-coordinates and the y-coordinates as the (x,y) representation or locating neighboring sub-partitions using the x-coordinates and the y-coordinates. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus comprises a z-scanning index-to-(x,y) representation conversion module for converting a z-scanning index to an (x,y) representation, an (x,y) representation-to-z-scanning index conversion module for converting the (x,y) representation to the z-scanning index, a z-scanning index-to-raster-scanning index conversion module for converting the z-scanning index to a raster-scanning index, a raster-scanning index-to-z-scanning index conversion module for converting the raster-scanning index to the z-scanning index, a raster-scanning index-to-(x,y) representation conversion module for converting the raster-scanning index to the (x,y) representation, an (x,y) representation-to-raster-scanning index conversion module for converting the (x,y) representation to the raster-scanning index and a selecting module for selecting which conversion module is implemented. The apparatus further comprises an extraction module for extracting bits to obtain x-coordinates and y-coordinates. The apparatus further comprises an extraction module for extracting a first half of a total bits for most significant bits and a second half of the total bits for least significant bits. The apparatus further comprises an interleaving module for interleaving bits. The apparatus further comprises an operation module for performing an operation with the z-scanning index, the raster-scanning index or the (x,y) representation. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus comprises a memory for storing an application, the application for extracting a first set of bits from even positions of an index to obtain x-coordinates, extracting a second set of bits from odd positions of the index to obtain y-coordinates and performing an operation with the x-coordinates and the y-coordinates and a processing component coupled to the memory, the processing component configured for processing the application. The index is a z-scanning index. A most significant bit of a binary representation of the z-scanning index is numbered as position 0, a second most significant bit is numbered as position 1, and subsequent bits are numbered accordingly. Performing the operation comprises storing the x-coordinates and the y-coordinates as an (x,y) representation, transferring the x-coordinates and the y-coordinates as the (x,y) representation or locating neighboring sub-partitions using the x-coordinates and the y-coordinates. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In yet another aspect, a method of converting an (x,y) representation to a z-scanning index comprises interleaving bits from x-coordinates and y-coordinates to form the z-scanning index and performing an operation with the z-scanning index. Interleaving includes putting the bits from the x-coordinates in even positions and putting the bits from the y-coordinates in odd positions. Performing the operation comprises storing the z-scanning index or transferring the z-scanning index. The device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In yet another aspect, a method of converting a raster-scanning index to an (x,y) representation comprises extracting most significant bits of the raster-scanning index to obtain y-coordinates, extracting least significant bits of the raster-scanning index to obtain x-coordinates and performing an operation with the (x,y) representation. Performing the operation comprises storing the x-coordinates and the y-coordinates as an (x,y) representation, transferring the x-coordinates and the y-coordinates as the (x,y) representation or locating neighboring sub-partitions using the x-coordinates and the y-coordinates. The device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, a method of converting a z-scanning index to a raster-scanning index comprises extracting odd position bits to obtain most significant bits of the raster-scanning index, extracting even position bits to obtain least significant bits of the raster-scanning index and performing an operation with the raster-scanning index. Performing the operation comprises storing the raster-scanning index or transferring the raster-scanning index. The device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

BRIEF DESCRIPTION OF THE DRAWINGS

FIG. 2 illustrates an example of the conversions between z-scanning and (x,y) representation using simple bit operations according to some embodiments.

FIG. 3 illustrates a flowchart of a method of converting from the z-scanning index to the (x,y) representation according to some embodiments.

FIG. 4 illustrates a flowchart of a method of converting from the (x,y) representation to the z-scanning index according to some embodiments.

DETAILED DESCRIPTION OF THE PREFERRED EMBODIMENT

Direct conversion between z-scanning and (x,y) representation is able to be performed by extracting certain bits. To convert a z-scanning index to an (x,y) representation: to obtain the x-coordinate, the bits from all even positions are extracted from the z-scanning index, and to obtain the y-coordinate, the bits from all odd positions are extracted from the z-scanning index. To convert an (x,y) representation to a z-scanning index, bits from the x coordinate and the y coordinate are interleaved, and bits from the x-coordinate are put in even positions and bits from the y-coordinate are put in odd positions. FIG. 2 illustrates an example of the conversions between z-scanning and (x,y) representation according to some embodiments.

Conversion between raster-scanning and (x,y) representation includes: Most Significant Bits (MSBs) of a raster-scanning index are the y-coordinates, and Least Significant Bits (LSBs) of the raster-scanning index are the x-coordinates. Conversion between z-scanning order and raster-scanning order is able to be performed through bit manipulations. MSBs of a raster-scanning index are the odd bits of a z-scanning index, and LSBs of a raster-scanning index are the even bits of a z-scanning index.

FIG. 3 illustrates a flowchart of a method of converting from the z-scanning index to the (x,y) representation according to some embodiments. In the step 300, bits from even positions in the z-scanning index are extracted to obtain the x-coordinates. In the step 302, bits from odd positions in the z-scanning index are extracted to obtain the y-coordinates. In the step 304, an operation is performed with the (x,y) representation. Operations are able to include any operations such as transferring the (x,y) representation, storing the (x,y) representation or locating neighboring sub-partitions. In some embodiments, bit positions are defined as even and odd by: counting from the MSB toward the LSB in the z-scanning index, the MSB is 0, the second MSB is 1 and so forth. In some embodiments, extracting the most significant bits is half of the total bits and the least significant bits is the other half of the total bits. Fewer or additional steps are able to be included.

FIG. 4 illustrates a flowchart of a method of converting from the (x,y) representation to the z-scanning index according to some embodiments. In the step 400, bits from the x-coordinate and the y-coordinate are interleaved. Specifically, bits from x are put in even positions and bits from y are put in odd positions. In the step 402, an operation is performed with the z-scanning index. Operations are able to include any operations such as transferring the z-scanning index or storing the z-scanning index. Fewer or additional steps are able to be included.

Figure 1:
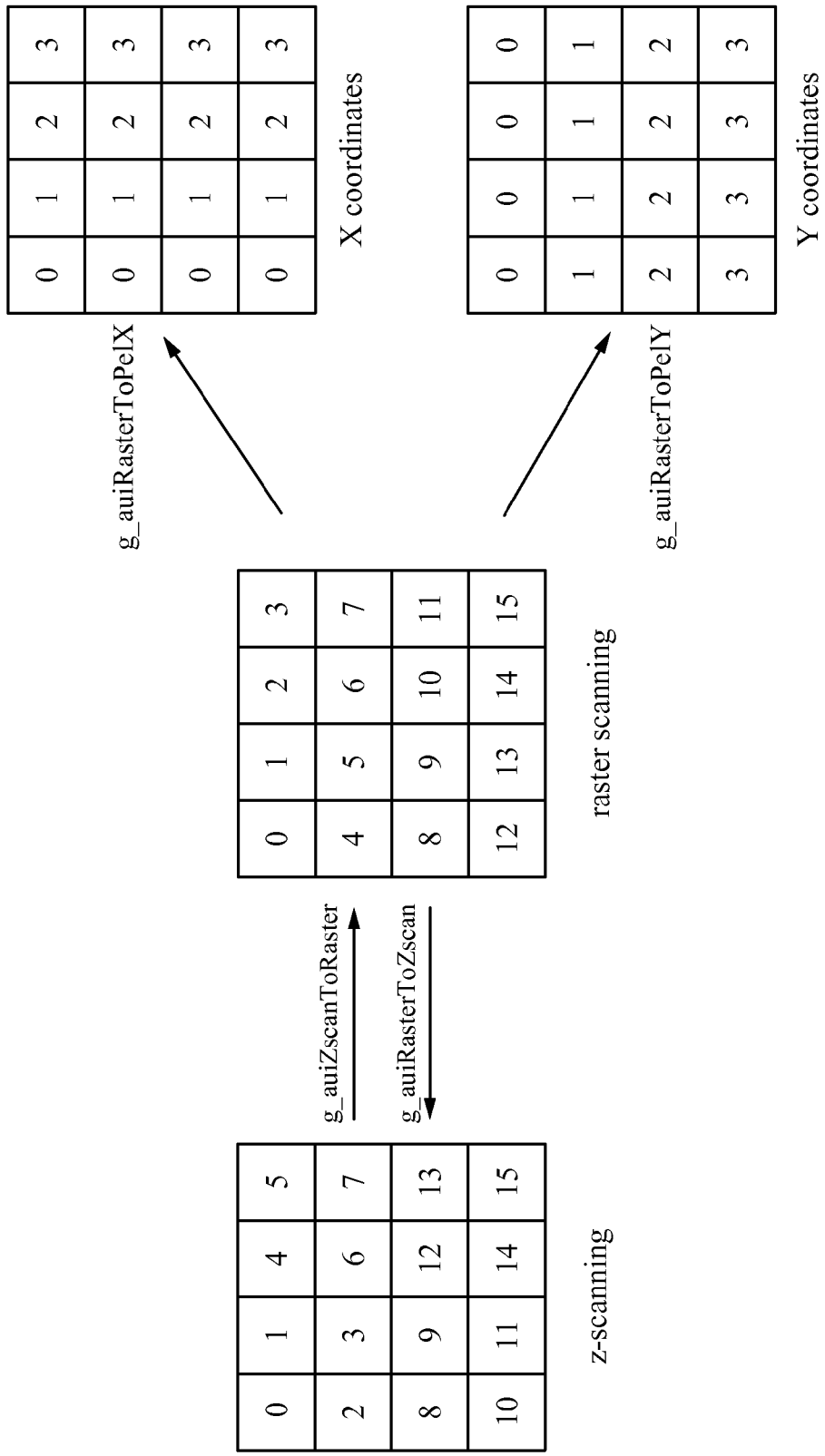
FIG. 1 illustrates a conventional approach that performs data conversion from z-scanning indexes to raster scanning indexes to 2-D (x,y) coordinates using multiple lookup tables.
Figure 5:
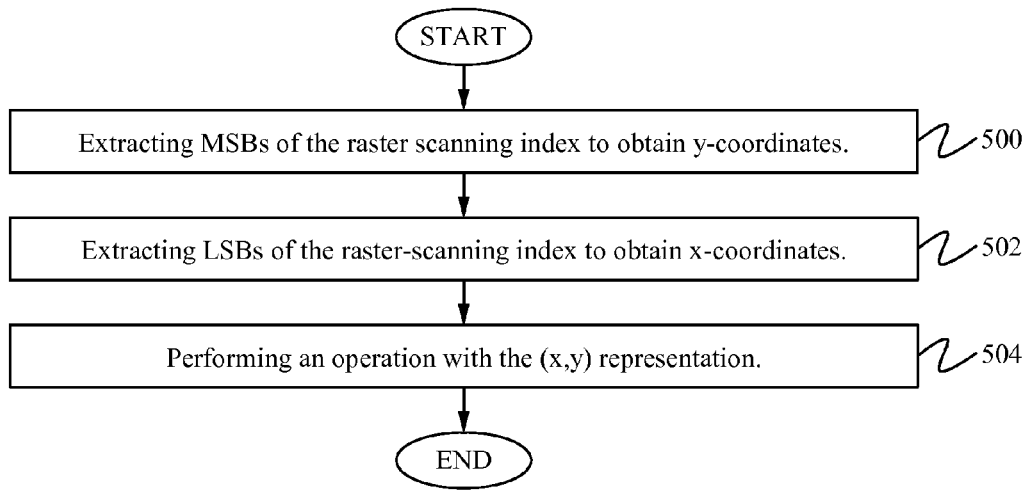
FIG. 5 illustrates a flowchart of a method of converting from the raster-scanning index to the (x,y) representation according to some embodiments.

FIG. 5 illustrates a flowchart of a method of converting from the raster-scanning index to the (x,y) representation according to some embodiments. In the step 500, MSBs of the raster-scanning index are extracted to obtain the y-coordinates. In the step 502, LSBs of the raster-scanning index are extracted to obtain the x-coordinates. In the step 504, an operation is performed with the (x,y) representation. Operations are able to include any operations such as transferring the (x,y) representation, storing the (x,y) representation or locating neighboring sub-partitions. In some embodiments, the number of bits extracted for x and y is specified as: if the maximum raster-scanning index uses 2N bits to represent, then y takes N MSBs and x takes N LSBs. For example, if raster-scanning indices range from 0-255, then each y takes 4 MSBs and each x takes 4 LSBs. Fewer or additional steps are able to be included. Similarly, an inverse operation is able to be performed to convert from the (x,y) representation to the raster-scanning index.

Figure 6:
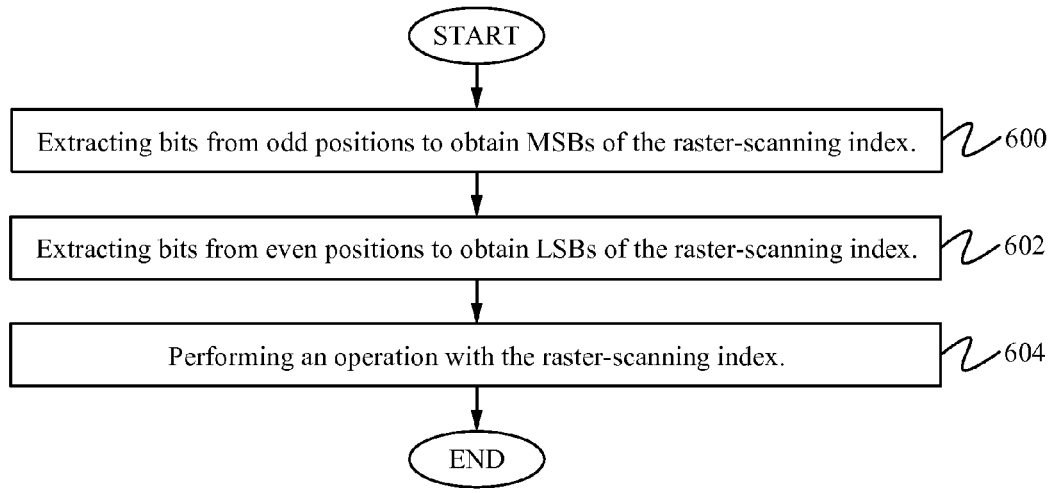
FIG. 6 illustrates a flowchart of a method of converting from the z-scanning index to the raster-scanning index according to some embodiments.

FIG. 6 illustrates a flowchart of a method of converting from the z-scanning index to the raster-scanning index according to some embodiments. In the step 600, odd bits of the z-scanning index are extracted to obtain MSBs of the raster-scanning index. In the step 602, even bits of the z-scanning index are extracted to obtain LSBs of the raster-scanning index. In the step 604, an operation is performed with the raster-scanning index. Operations are able to include any operations such as transferring the raster-scanning index or storing the raster-scanning index. Fewer or additional steps are able to be included. Similarly, an inverse operation is able to be performed to convert from the raster-scanning index to the z-scanning index.

Figure 7:
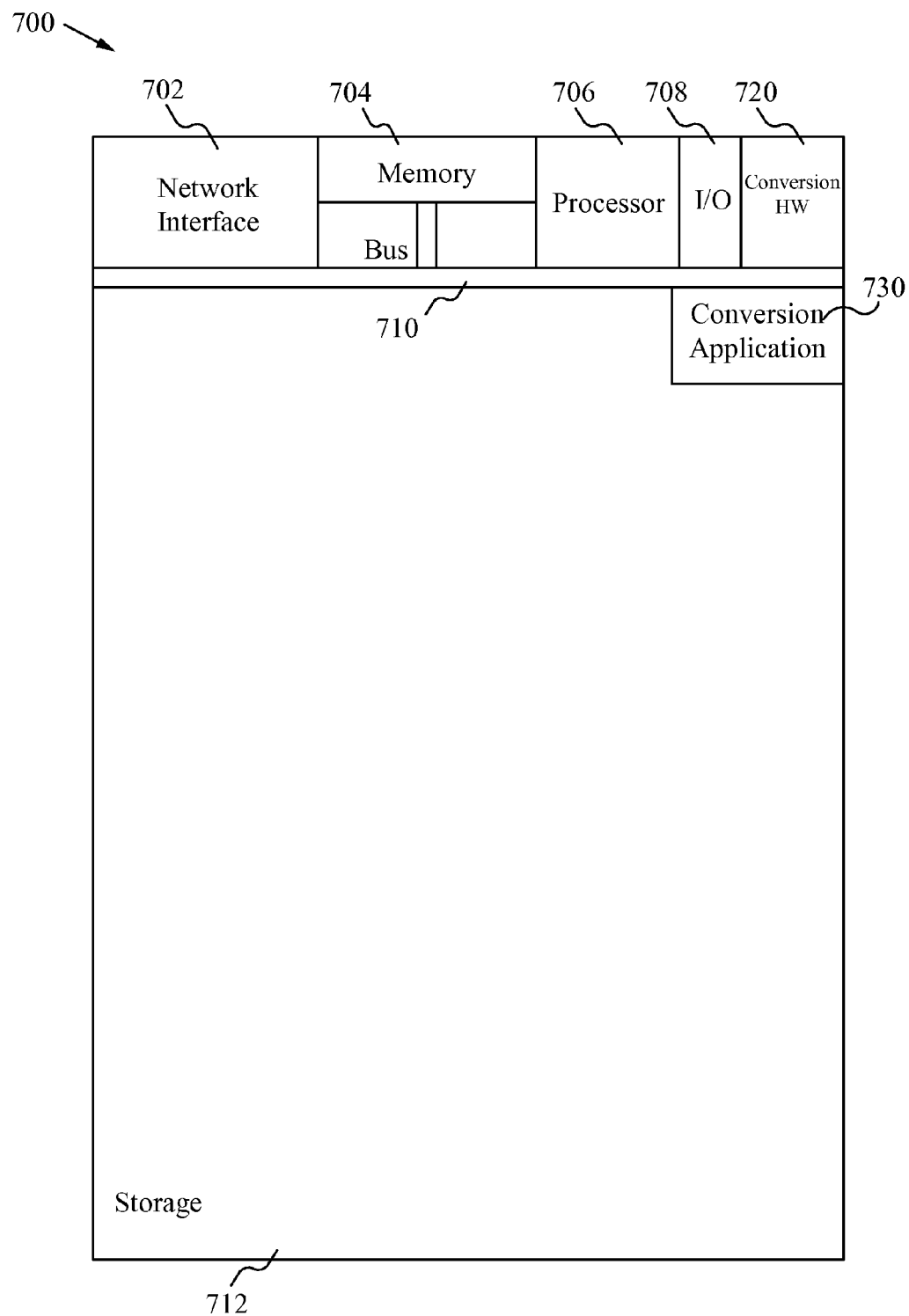
FIG. 7 illustrates a block diagram of an exemplary computing device configured to implement the conversion methods using simple bit-operations according to some embodiments.

FIG. 7 illustrates a block diagram of an exemplary computing device 700 configured to implement the conversion methods using simple bit-operations according to some embodiments. The computing device 700 is able to be used to acquire, store, compute, process, communicate and/or display information such as images, videos and audio. For example, a computing device 700 is able to acquire and store a video. The conversion methods are able to be used during or after acquiring the video, or when displaying the video on the device 700. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. In some embodiments, the hardware structure includes multiple processors and other hardware to perform parallel processing. Conversion application(s) 730 used to perform the conversion are likely to be stored in the storage device 712 and memory 704 and processed as applications are typically processed. More or less components shown in FIG. 7 are able to be included in the computing device 700. In some embodiments, conversion hardware 720 is included. Although the computing device 700 in FIG. 7 includes applications 730 and hardware 720 for implementing the conversion methods, the conversion methods are able to be implemented on a computing device in hardware, firmware, software or any combination thereof. For example, in some embodiments, the conversion applications 730 are programmed in a memory and executed using a processor. In another example, in some embodiments, the conversion hardware 720 is programmed hardware logic including gates specifically designed to implement the method.

In some embodiments, the conversion application(s) 730 include several applications and/or modules. Modules include a z-scanning index-to-(x,y) representation conversion module, an (x,y) representation-to-z-scanning index conversion module, a z-scanning index-to-raster-scanning index conversion module, a raster-scanning index-to-z-scanning index conversion module, a raster-scanning index-to-(x, y) representation conversion module and an (x,y) representation-to-raster-scanning index conversion module. In some embodiments, a selecting module selects which conversion is implemented. For example, the selecting module receives a z-scanning index and determines to convert the index into an (x,y) representation. In some embodiments an input is received indicating the desired conversion. In some embodiments, modules include one or more sub-modules as well. For example, extraction modules, interleaving modules and/or operation modules are implemented. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system or any other suitable computing device.

To utilize the conversion methods using simple bit-operations, a user acquires a video/image such as on a digital camcorder, and while or after the video is acquired, or when displaying the video, the conversion methods are automatically used for processing the image, for example, for determining neighboring sub-partitions in an image. The conversion methods are able to be implemented automatically without user involvement.

In operation, the conversion implementations are able to use simple bit operations instead of multiple table lookups to convert between z-scanning indices, raster-scanning indices and (x,y) coordinates. The described implementations are also able to be used to reduce gate sizes in hardware implementations by avoiding the storage of multiple tables.

Some Embodiments of Conversion between Z-Scanning Indices, Raster-Scanning Indices and 2-D Coordinates Using Simple Bit-Operations in HEVC 1. A method of converting data in a controller of a device comprising:
    a. extracting a first set of bits from even positions of an index to obtain x-coordinates;
    b. extracting a second set of bits from odd positions of the index to obtain y-coordinates; and
    c. performing an operation with the x-coordinates and the y-coordinates.
2. The method of clause 1 wherein the index is a z-scanning index.
3. The method of clause 2 wherein a most significant bit of a binary representation of the z-scanning index is numbered as position 0, a second most significant bit is numbered as position 1, and subsequent bits are numbered accordingly.
4. The method of clause 1 wherein performing the operation comprises storing the x-coordinates and the y-coordinates as an (x,y) representation, transferring the x-coordinates and the y-coordinates as the (x,y) representation or locating neighboring sub-partitions using the x-coordinates and the y-coordinates.
5. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

6. An apparatus comprising:
   a. a z-scanning index-to-(x,y) representation conversion module for converting a z-scanning index to an (x,y) representation;
   b. an (x,y) representation-to-z-scanning index conversion module for converting the (x,y) representation to the z-scanning index;
   c. a z-scanning index-to-raster-scanning index conversion module for converting the z-scanning index to a raster-scanning index;
   d. a raster-scanning index-to-z-scanning index conversion module for converting the raster-scanning index to the z-scanning index;
   e. a raster-scanning index-to-(x,y) representation conversion module for converting the raster-scanning index to the (x,y) representation;
   f. an (x,y) representation-to-raster-scanning index conversion module for converting the (x,y) representation to the raster-scanning index; and
   g. a selecting module for selecting which conversion module is implemented.
7. The apparatus of clause 6 further comprising an extraction module for extracting bits to obtain x-coordinates and y-coordinates.
8. The apparatus of clause 6 further comprising an extraction module for extracting a first half of a total bits for most significant bits and a second half of the total bits for least significant bits.
9. The apparatus of clause 6 further comprising an interleaving module for interleaving bits.
10. The apparatus of clause 6 further comprising an operation module for performing an operation with the z-scanning index, the raster-scanning index or the (x,y) representation.
11. The apparatus of clause 6 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
12. An apparatus comprising:
   a. a memory for storing an application, the application for:
      i. extracting a first set of bits from even positions of an index to obtain x-coordinates;
      ii. extracting a second set of bits from odd positions of the index to obtain y-coordinates; and
      iii. performing an operation with the x-coordinates and the y-coordinates; and
   b. a processing component coupled to the memory, the processing component configured for processing the application.
13. The apparatus of clause 12 wherein the index is a z-scanning index.
14. The apparatus of clause 13 wherein a most significant bit of a binary representation of the z-scanning index is numbered as position 0, a second most significant bit is numbered as position 1, and subsequent bits are numbered accordingly.
15. The apparatus of clause 12 wherein performing the operation comprises storing the x-coordinates and the y-coordinates as an (x,y) representation, transferring the x-coordinates and the y-coordinates as the (x,y) representation or locating neighboring sub-partitions using the x-coordinates and the y-coordinates.
16. The apparatus of clause 12 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
17. A method of converting an (x,y) representation to a z-scanning index comprising:
   a. interleaving bits from x-coordinates and y-coordinates to form the z-scanning index; and
   b. performing an operation with the z-scanning index.
18. The method of clause 17 wherein interleaving includes putting the bits from the x-coordinates in even positions and putting the bits from the y-coordinates in odd positions.
19. The method of clause 17 wherein performing the operation comprises storing the z-scanning index or transferring the z-scanning index.
20. The method of clause 17 wherein the device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
21. A method of converting a raster-scanning index to an (x,y) representation comprising:
   a. extracting most significant bits of the raster-scanning index to obtain y-coordinates;
   b. extracting least significant bits of the raster-scanning index to obtain x-coordinates; and
   c. performing an operation with the (x,y) representation.
22. The method of clause 21 wherein performing the operation comprises storing the x-coordinates and the y-coordinates as an (x,y) representation, transferring the x-coordinates and the y-coordinates as the (x,y) representation or locating neighboring sub-partitions using the x-coordinates and the y-coordinates.
23. The method of clause 21 wherein the device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
24. A method of converting a z-scanning index to a raster-scanning index comprising:
   a. extracting odd position bits to obtain most significant bits of the raster-scanning index;
   b. extracting even position bits to obtain least significant bits of the raster-scanning index; and
   c. performing an operation with the raster-scanning index.
25. The method of clause 24 wherein performing the operation comprises storing the raster-scanning index or transferring the raster-scanning index.
26. The method of clause 24 wherein the device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of converting data in a controller of a device comprising:
   a. extracting a first set of bits from even positions of an index to obtain x-coordinates;
   b. extracting a second set of bits from odd positions of the index to obtain y-coordinates; and
   c. performing an operation with the obtained x-coordinates and the obtained y-coordinates.

2. The method of claim 1 wherein the index is a z-scanning index.

3. The method of claim 2 wherein a most significant bit of a binary representation of the z-scanning index is numbered as position 0, a second most significant bit is numbered as position 1, and subsequent bits are numbered accordingly.

4. The method of claim 1 wherein performing the operation comprises storing the x-coordinates and the y-coordinates as an (x,y) representation, transferring the x-coordinates and the y-coordinates as the (x,y) representation or locating neighboring sub-partitions using the x-coordinates and the y-coordinates.

5. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a smart phone, a tablet computer, a video player, a DVD writer/player, a high definition video writer/player, a television and a home entertainment system.

6. An apparatus comprising:
   a. a z-scanning index-to-(x,y) representation conversion module for converting a z-scanning index to an (x,y) representation;
   b. an (x,y) representation-to-z-scanning index conversion module for converting the (x,y) representation to the z-scanning index;
   c. a z-scanning index-to-raster-scanning index conversion module for converting the z-scanning index to a raster-scanning index;
   d. a raster-scanning index-to-z-scanning index conversion module for converting the raster-scanning index to the z-scanning index;
   e. a raster-scanning index-to-(x,y) representation conversion module for converting the raster-scanning index to the (x,y) representation;
   f. an (x,y) representation-to-raster-scanning index conversion module for converting the (x,y) representation to the raster-scanning index; and
   g. a selecting module for selecting which conversion module is implemented.

7. The apparatus of claim 6 further comprising an extraction module for extracting bits to obtain x-coordinates and y-coordinates.

8. The apparatus of claim 6 further comprising an extraction module for extracting a first half of a total bits for most significant bits and a second half of the total bits for least significant bits.

9. The apparatus of claim 6 further comprising an interleaving module for interleaving bits.

10. The apparatus of claim 6 further comprising an operation module for performing an operation with the z-scanning index, the raster-scanning index or the (x,y) representation.

11. The apparatus of claim 6 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a smart phone, a tablet computer, a video player, a DVD writer/player, a high definition video writer/player, a television and a home entertainment system.

12. An apparatus comprising:
   a. a memory for storing an application, the application for:
      i. extracting a first set of bits from even positions of an index to obtain x-coordinates;
      ii. extracting a second set of bits from odd positions of the index to obtain y-coordinates; and
      iii. performing an operation with the obtained x-coordinates and the obtained y-coordinates; and
   b. a processing component coupled to the memory, the processing component configured for processing the application.

13. The apparatus of claim 12 wherein the index is a z-scanning index.

14. The apparatus of claim 13 wherein a most significant bit of a binary representation of the z-scanning index is numbered as position 0, a second most significant bit is numbered as position 1, and subsequent bits are numbered accordingly.

15. The apparatus of claim 12 wherein performing the operation comprises storing the x-coordinates and the y-coordinates as an (x,y) representation, transferring the x-coordinates and the y-coordinates as the (x,y) representation or locating neighboring sub-partitions using the x-coordinates and the y-coordinates.

16. The apparatus of claim 12 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a smart phone, a tablet computer, a video player, a DVD writer/player, a high definition video writer/player, a television and a home entertainment system.

17. A method of converting an (x,y) representation to a z-scanning index comprising:
   a. interleaving bits from x-coordinates and y-coordinates to form the z-scanning index, wherein interleaving includes putting the bits from the x-coordinates in even positions and putting the bits from the y-coordinates in odd positions; and
   b. performing an operation with the formed z-scanning index.

18. The method of claim 17 wherein performing the operation comprises storing the z-scanning index or transferring the z-scanning index.

19. The method of claim 17 wherein the device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a smart phone, a tablet computer, a video player, a DVD writer/player, a high definition video writer/player, a television and a home entertainment system.

20. A method of converting a raster-scanning index to an (x,y) representation comprising:
  a. extracting most significant bits of the raster-scanning index to obtain y-coordinates;
  b. extracting least significant bits of the raster-scanning index to obtain x-coordinates; and
  c. performing an operation with the (x,y) representation of the obtained y-coordinates and the obtained x-coordinates.

21. The method of claim 20 wherein performing the operation comprises storing the x-coordinates and the y-coordinates as an (x,y) representation, transferring the x-coordinates and the y-coordinates as the (x,y) representation or locating neighboring sub-partitions using the x-coordinates and the y-coordinates.

22. The method of claim 20 wherein the device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an a portable music player, a smart phone, a tablet computer, a video player, a DVD writer/player, a high definition video writer/player, a television and a home entertainment system.

23. A method of converting a z-scanning index to a raster-scanning index comprising:
  a. extracting odd position bits to obtain most significant bits of the raster-scanning index;
  b. extracting even position bits to obtain least significant bits of the raster-scanning index; and
  c. performing an operation with the obtained most significant bits and the obtained least significant bits of the raster-scanning index.

24. The method of claim 23 wherein performing the operation comprises storing the raster-scanning index or transferring the raster-scanning index.

25. The method of claim 23 wherein the device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a smart phone, a tablet computer, a video player, a DVD writer/player, a high definition video writer/player, a television and a home entertainment system.

\* \* \* \* \*